United States Patent
Charette

(10) Patent No.: US 7,141,093 B2
(45) Date of Patent: Nov. 28, 2006

(54) HYDRATED LIME KILN DUST RECIRCULATION METHOD FOR GAS SCRUBBING

(75) Inventor: Alain Charette, Joliette (CA)

(73) Assignee: Graymont QC Inc., Joliette (CA)

( * ) Notice: Subject to any disclaimer, the term of this patent is extended or adjusted under 35 U.S.C. 154(b) by 336 days.

(21) Appl. No.: 10/895,136

(22) Filed: Jul. 21, 2004

(65) Prior Publication Data

US 2005/0031515 A1 Feb. 10, 2005

Related U.S. Application Data

(60) Provisional application No. 60/491,962, filed on Aug. 4, 2003.

(51) Int. Cl.
*B01D 53/50* (2006.01)

(52) U.S. Cl. .............................. 95/107; 95/137; 95/900; 423/244.07

(58) Field of Classification Search ................... 95/90, 95/107, 137, 134, 131, 132, 900; 502/22; 106/707, 751; 423/244.07; 110/203
See application file for complete search history.

(56) References Cited

U.S. PATENT DOCUMENTS

| | | | | |
|---|---|---|---|---|
| 4,031,184 A | * | 6/1977 | McCord | 423/197 |
| 4,195,062 A | | 3/1980 | Martin et al. | 422/168 |
| 4,220,476 A | * | 9/1980 | Touborg | 106/751 |
| 4,250,134 A | * | 2/1981 | Minnick | 588/257 |
| 4,402,891 A | * | 9/1983 | Kachinski, Jr. | 264/40.1 |
| 4,716,027 A | | 12/1987 | Morrison | 423/225 |
| 5,270,015 A | * | 12/1993 | Rochelle et al. | 422/168 |
| 5,785,936 A | * | 7/1998 | Levendis | 423/210 |
| 6,331,207 B1 | | 12/2001 | Gebhardt | 106/751 |
| 6,613,141 B1 | * | 9/2003 | Key, Jr. | 106/751 |

\* cited by examiner

*Primary Examiner*—Frank M. Lawrence
(74) *Attorney, Agent, or Firm*—Paul S. Sharpe; Ogilvy Renault LLP

(57) ABSTRACT

A method of scrubbing a gas stream with re-circulated kiln dust when the kiln dust is hydrated to form a sorbent. The sorbent is re-circulated with un-reacted flue gas stream for scrubbing.

16 Claims, 1 Drawing Sheet

HYDRATED LIME KILN DUST RECIRCULATION METHOD FOR GAS SCRUBBING

FIELD OF THE INVENTION

This application claims benefit of U.S. Provisional Application No. 60/491,962, filed Aug. 4, 2003.

BACKGROUND OF THE INVENTION

It is well established in the manufacturing of lime/cement products that limestone which is initially quarried exposed to additional unit operations for processing is eventually calcined with various kilns, examples of which are the vertical or rotary type kilns. In these kilns, the limestone is calcined at a high temperature, generally 1200° C. or greater at which point the material is converted to lime. In the calcination process carbon dioxide is removed from the calcium carbonate to leave calcium oxide. The lime may be hydrated by treatment with water to create calcium hydroxide which generally is in the form of a fine white powder which can be pulverized to any size distribution depending upon the final use of the product.

In view of the fact that the kilns are used to generate high temperatures for the conversion process, result is the generation of a flue gas at the lime/cement plant. The gas may contain some unwanted pollutants, which may become a problem in terms of pollution emission. This may aim as an issue in light of increasingly stringent environmental requirements to reduce air pollution significantly. Numerous advances have been made in pollution control for this industry. Currently, there are wet, semi-wet and semi-dry scrubbing systems which require the use of an external source of sorbent. The sorbent most desirable is the hydrated lime for flue gas scrubbing.

Gebhardt, in U.S. Pat. No. 6,331,207, issued Dec. 18, 2001, teaches a method of treating cement kiln dust for recovery and recycle. In the patent, it is indicated that the supply of cement kiln dust may be moistened and subsequently treated with carbon dioxide to convert the materials to carbonates. During the carbonation cycle, the water in the hydroxides is released to formulate slurry. The soluble alkalis and sulfate are released in the liquid phase with the solids being separated from the liquid. The solids, subsequent to washing, provide a useful feed to the kiln. The liquid contains alkali salts. The gases from the kiln are conditioned by condensation of water and the removal of ammonium compounds.

A further wet process is taught in U.S. Pat. No. 4,716,027, issued Dec. 29, 1987, to Morrison. The reference relates to a simultaneous scrubbing and removal process where acidic exhaust gases are scrubbed and metal salts are removed from alkaline waste dust to produce useful products. Similar to the above-mentioned reference, this reference relies on contact of the gas to be scrubbed with basic slurry.

Martin et al., in U.S. Pat. No. 4,195,062, issued Mar. 25, 1980 discloses a further variation on the wet scrubbing process where a portion of the effluent in a limestone flue gas scrubbing system is removed to a reaction tank which has a controlled pH. A slurry material is re-circulated into a spray tower for contact with the flue gas.

In view of the prior art techniques that have been employed, it would be desirable to have a process that is either semi-wet or dry which is self sustaining and does not require the addition of materials to formulate a sorbent for flue gas scrubbing. The present invention is directed to satisfying this need.

SUMMARY OF THE INVENTION

One object of the present invention is to provide an improved methodology for flue gas scrubbing in a lime/cement manufacturing process.

A further object of one embodiment of the present invention is to provide a method of scrubbing a gas stream with re-circulated kiln dust, comprising:
  providing a source of kiln dust;
  forming a sorbent for gas scrubbing including:
  hydrating the dust to form hydrated lime;
  recirculating collected dry kiln dust;
  converting the collected lime kiln dust into hydrated lime to form the sorbent;
  conditioning the sorbent; and
  contacting the sorbent with the gas stream to be scrubbed.

It has been found that by making use of the residual free lime in the collected lime kiln dust, a very suitable sorbent can be generated within the system in the absence of adding sorbent to the process. This obviously is very efficient from a cost point of view and in effect, renders the manufacturing process for the lime as a self sustaining process that effectively self cleans the flue gas. By hydrating the free lime, the result is a very effective sorbent for removing pollutants such heavy metals, halo compounds, sulfur compounds inter alia.

In respect of a further object of one embodiment of the present invention, there is provided a scrubbing process for flue gas generated in a lime/cement synthesis plant having kilns for calcining limestone, comprising:
  hydrating lime kiln dust to capture residual free lime present in the dust;
  contacting hydrated lime with a flue gas stream generated from the kilns for a period sufficient for reaction with pollutants present in the flue gas;
  re-circulating collected un-reacted hydrated lime kiln dust for mixture with new source of lime kiln dust to improve contact and sorbent reaction with the flue gas, whereby the sorbent is replenished in the absence of extraneous sorbent injection.

As a further advantage to the process as set forth herein, the methodology allows control of the temperature in the reactor where the flue gas is contacted with the sorbent. As is known, temperature has an effect on pollution absorption and the process allows temperature control by adjustment of the water content in the sorbent. A further option for temperature control is by water injection directly into the reactor within which the flue gas and sorbent are contacted.

Having thus generally described the invention, reference will now be made to the accompanying drawing.

DETAILED DESCRIPTION OF THE PREFERRED EMBODIMENTS

Figure 1:
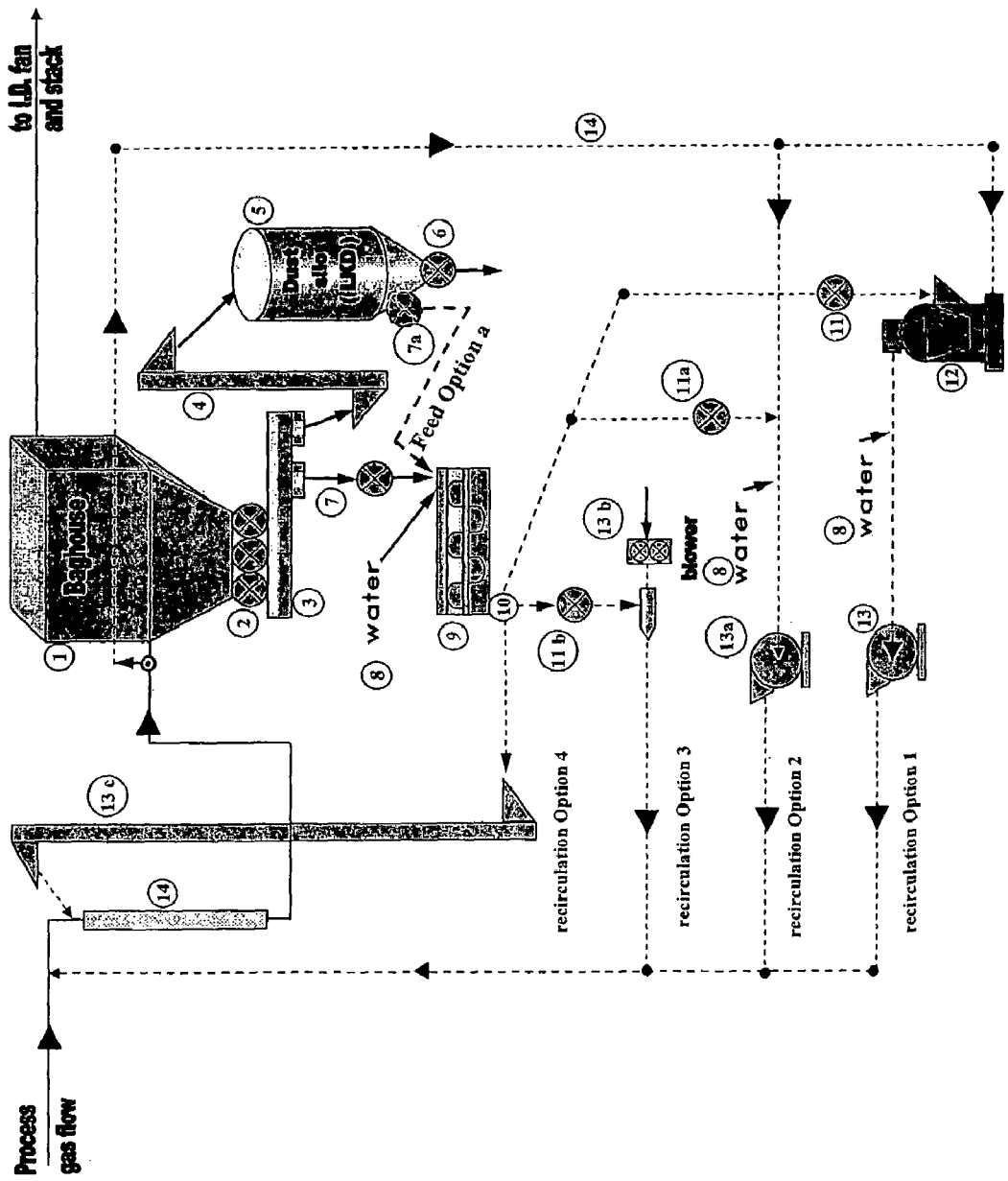
FIG. 1 is a schematic illustration of the process according to one embodiment of the present invention.

Referring now to FIG. 1, numeral 10 denotes the overall process. A baghouse 12 collects lime kiln dust from the lime/cement calcining procedure (not shown). From the baghouse 12 the dust is passed down to a collection point 14 which collection point 14 collects kiln dust material from all other sources (the other sources are not shown). The conveyance of the material from the baghouse to the collection point 14 is conducted in an airtight arrangement with the airlock being denoted by numeral 16. The collected dust is then passed to a conveyor 18. The conveyor may be any type of suitable conveyor such as a screw conveyor, bucket conveyor or any other suitable conveyor known to those skilled in the art. The material may be then transferred to a silo 20. The silo is equipped with a discharge device denoted by numeral 22. In the embodiment illustrated, the silo 22 includes a feeder 24 which is an optional feature to augment the feed that otherwise is delivered by feeder 26 directly from collection point 14. Material from either or both of feeders 24, 26 is transferred into a mixing device 28 which may comprise a hydrator into which water, globally denoted by numeral 30 is introduced. The mixing device 28 will facilitate adequate residency time between the lime kiln dust and the water to effect adequate hydration. Once sufficiently hydrated, the hydrated lime may exit the mixing device at 32. At this point, the sorbent exiting at 32 may be recycled in a number of different ways which will now be discussed.

As a first option, hydrated lime exiting at 32 may follow the route designated by numeral 34 through an airlock 36 and subsequently into a pulverizer 38. In the pulverizer 38 the hydrated lime may be mixed with additional material from baghouse 12 as indicated by numeral 40. This optional grinding device provides high mixing and increases the sorbent contact surface while making a very fine product mixture. The pulverized mixture is then treated with water as indicated by numeral 42 and exposed to hot process gas, for flash drying, by a fan 44 prior to re-circulation along line 46. In this manner, the sorbent is effectively recycled to the outlet of the process.

In respect of a second alternative, hydrated lime exiting at 32 travels through airlock and travels through fan 44 for exposure to the hot process gas for flash drying as indicated with respect to the previous route. The subsequently treated material then returns to the outset of the process via line 46.

As a third alternative, the hydrated lime will pass through airlock 50 and will be transported for recirculation with blower 52.

As a final alternative, a mechanical system can be employed for the recirculation other than the pneumatic transport discussed herein previously with respect to the other methods. The mechanical system in this example is a bucket conveyor 54 which simply transports the sorbent back into the hot gas duct 56 of the baghouse 12.

The system employed herein has been found to be particularly useful to capture or otherwise scrub several pollutants from the flue gas such as the sulphur dioxide and usher trioxide compounds as well as halo compounds such as hydrogen fluoride, hydrogen chloride, mercury, cadmium, lead and other heavy metals which may be contained in the main lime or the cement kiln process gas stream. As a further advantage to the overall process, carbon dioxide can be sequestered in this process which is an attractive feature from a perspective of greenhouse gas concerns. Conveniently, the passage of sorbent into the reactor duct increases the baghouse dust load. The re-circulating load allows the non-reacted sorbent from the first run through the system sufficient exposure time to enhance reaction with the pollutants in the gas stream. The baghouse inlet load may be increased as desired with a typical load ratio being from between 2:1 and 10:1. The ratio is related to a number of factors including sorbent fineness, available free lime in the lime kiln dust and residence time of the sorbent in the reactor duct.

In terms of the conditioning of the sorbent, as discussed herein previously a number of existing units type may be effected to enhance the quality of the sorbent and therefore the scrubbing capacity of the compound.

The fineness can be adjusted by making use of the pulverizer 38 until such time as a size distribution that is desirable is created. Classification of the sorbent may be achieved according to the pulverizer type selected. Some have internal static vanes while others use a dynamic classifying system. Fines can also be adjusted by changing the grid or the opening of the unit. These principles are generally known to those skilled.

Although embodiments of the invention have been described above, it is not limited thereto and it will be apparent to those skilled in the art that numerous modifications form part of the present invention insofar as they do not depart from the spirit, nature and scope of the claimed and described invention.

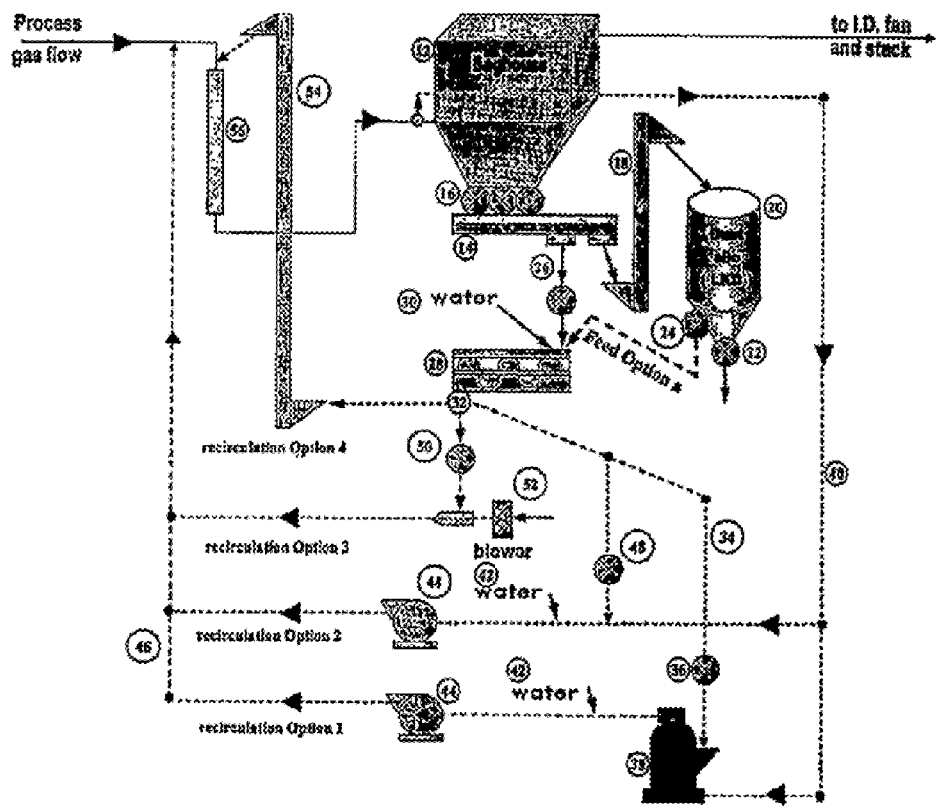

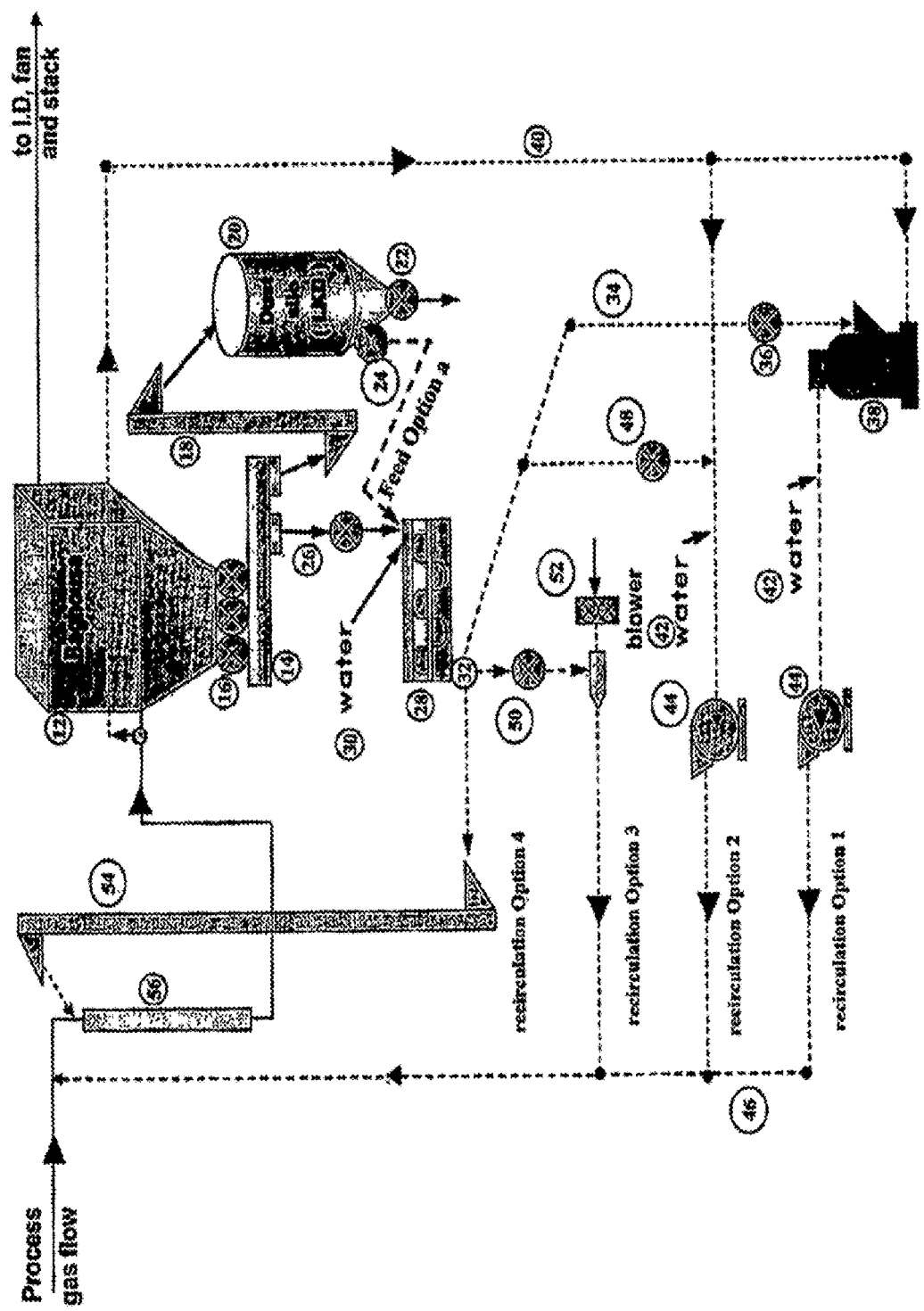

I claim:

1. A method of scrubbing a gas stream with re-circulated kiln dust, comprising:
   providing a source of kiln dust;
   forming a sorbent for gas scrubbing including:
   hydrating said dust to form hydrated lime to form said sorbent;
   re-circulating collected kiln dust;
   mixing said collected kiln dust with said hydrated lime sorbent;
   conditioning said sorbent with water to optimize scrubbing temperature; and
   contacting said sorbent with said gas stream to be scrubbed.

2. The method as set forth in claim 1, wherein said method is a semi-dry method.

3. The method as set forth in claim 1, wherein said conditioning includes at least one unit operation selected from the group consisting of flash drying, pulverizing, and classifying.

4. The method as set forth in claim 1, wherein conditioned sorbent is contacted by said gas to be scrubbed by forced circulation.

5. The method as set forth in claim 1, further including the step of controlling the temperature at which said scrubbing occurs.

6. The method as set forth in claim 5, wherein said temperature is controlled by adjusting water volume in said sorbent.

7. The method as set forth in claim 6, wherein said temperature is controlled by water injection in a reactor within which said gas is scrubbed.

8. The method as set forth in claim 1, further including the step of flash drying said sorbent.

9. A scrubbing process for flue gas generated in a lime synthesis plant having kilns for calcining limestone, comprising:
   hydrating lime kiln dust to capture residual free lime present in said dust;
   contacting, hydrated lime with a flue gas stream generated from said kilns for a period sufficient for reaction with pollutants present in said flue gas; and re-circulating collected non-hydrated lime kiln dust for mixture with hydrated lime kiln dust sorbent for contact and reaction with said flue gas, whereby said sorbent is replenished in the absence of extraneous sorbent injection.

10. The method as set forth in claim 9, wherein said process is self-sustaining.

11. The method as set forth in claim 9, wherein said hydrated lime is conditioned prior to contact with said flue gas.

12. The method as set forth in claim 11, wherein conditioning of said hydrated lime includes a unit operation selected from the group consisting of flash drying, pulverizing, and classifying.

13. The method as set forth in claim 11, wherein said sorbent is pneumatically conveyed for contact with said flue gas.

14. The method as set forth in claim 11, wherein said sorbent is mechanically conveyed for contact with said flue gas.

15. The method as set forth in claim 11, wherein said method is conducted in an air lock.

16. The method as set forth in claim 9, further including the step of repeatedly re-circulating sorbent for maximizing the efficiency of said process.

* * * * *

UNITED STATES PATENT AND TRADEMARK OFFICE
CERTIFICATE OF CORRECTION

| | | |
|---|---|---|
| PATENT NO. | : 7,141,093 B2 | Page 1 of 4 |
| APPLICATION NO. | : 10/895136 | |
| DATED | : November 28, 2006 | |
| INVENTOR(S) | : Alain Charette | |

It is certified that error appears in the above-identified patent and that said Letters Patent is hereby corrected as shown below:

The Title page showing illustrative Fig should be deleted and replace with the Title page attached.

In the Drawing

The numbering in Figure 1 has been changed according to the following:

a) number 1 has been changed to number 12;
b) number 2 has been changed to number 16;
c) number 3 has been changed to number 14;
d) number 4 has been changed to number 18;
e) number 5 has been changed to number 20;
f) number 6 has been changed to number 22;
g) number 7 has been changed to number 26;
h) number 7a has been changed to number 24;
i) number 8 has been changed to number 30;
j) number 9 has been changed to number 28;
k) number 10 has been changed to number 32;
l) number 11 has been changed to number 36;
m) number 11a has been changed to number 48;
n) number 11b has been changed to number 50;
o) number 12 has been changed to number 38;
p) number 13 has been changed to number 44;
q) number 13a has been changed to number 44;
r) number 13b has been changed to number 52;
s) number 13 c has been changed to number 54;
t) number 14 at upper left section of Figure 1 has been changed to number 56;
u) number 14 on far right side of Figure 1 has been changed to number 40;
v) number 34 has been added to identify an exit route for hydrated lime;
w) number 42 has been added to identify water treatment of the pulverized mixture; and
x) number 46 has been added to indicate the recirculation route.

UNITED STATES PATENT AND TRADEMARK OFFICE
CERTIFICATE OF CORRECTION

PATENT NO. : 7,141,093 B2
APPLICATION NO. : 10/895136
DATED : November 28, 2006
INVENTOR(S) : Alain Charette It is certified that error appears in the above-identified patent and that said Letters Patent is hereby corrected as shown below:

In the Drawing (cont'd)

Drawing Sheet consisting of Fig 1 should be deleted and replace with Fig 1 attached.

Signed and Sealed this

Third Day of July, 2007

JON W. DUDAS
*Director of the United States Patent and Trademark Office*

United States Patent
Charette

(12) United States Patent
(10) Patent No.: US 7,141,093 B2
(45) Date of Patent: Nov. 28, 2006

(54) HYDRATED LIME KILN DUST RECIRCULATION METHOD FOR GAS SCRUBBING

(75) Inventor: Alain Charette, Joliette (CA)

(73) Assignee: Graymont QC Inc., Joliette (CA)

(*) Notice: Subject to any disclaimer, the term of this patent is extended or adjusted under 35 U.S.C. 154(b) by 336 days.

(21) Appl. No.: 10/895,136

(22) Filed: Jul. 21, 2004

(65) Prior Publication Data
US 2005/0031515 A1 Feb. 10, 2005

Related U.S. Application Data

(60) Provisional application No. 60/491,962, filed on Aug. 4, 2003.

(51) Int. Cl.
B01D 53/50 (2006.01)

(52) U.S. Cl. .................. 95/107; 95/137; 95/900; 423/244.07

(58) Field of Classification Search ............... 95/90, 95/107, 137, 134, 131, 132, 900; 502/22; 106/707, 751; 423/244.07; 110/203
See application file for complete search history.

(56) References Cited

U.S. PATENT DOCUMENTS

| | | | | |
|---|---|---|---|---|
| 4,031,184 A * | 6/1977 | McCord | | 423/197 |
| 4,195,062 A | 3/1980 | Martin et al. | | 422/168 |
| 4,220,476 A * | 9/1980 | Touborg | | 106/751 |
| 4,250,134 A | 2/1981 | Minnick | | 588/257 |
| 4,402,891 A | 9/1983 | Kachinski, Jr. | | 264/40.1 |
| 4,716,027 A | 12/1987 | Morrison | | 423/225 |
| 5,270,015 A * | 12/1993 | Rochelle et al. | | 422/168 |
| 5,785,936 A * | 7/1998 | Levendis | | 423/210 |
| 6,331,207 B1 | 12/2001 | Gebhardt | | 106/751 |
| 6,613,141 B1 * | 9/2003 | Key, Jr. | | 106/751 |

* cited by examiner

Primary Examiner—Frank M. Lawrence
(74) Attorney, Agent, or Firm—Paul S. Sharpe; Ogilvy Renault LLP

(57) ABSTRACT

A method of scrubbing a gas stream with re-circulated kiln dust when the kiln dust is hydrated to form a sorbent. The sorbent is re-circulated with un-reacted flue gas stream for scrubbing.

16 Claims, 1 Drawing Sheet